(12) United States Patent
Yoon et al.

(10) Patent No.: US 8,153,099 B2
(45) Date of Patent: Apr. 10, 2012

(54) UNIFORMLY B-ORIENTED MFI ZEOLITE MEMBRANE WITH VARIABLE THICKNESS SUPPORTED ON SUBSTRATE AND PREPARATION METHOD THEREOF

(75) Inventors: Kyung Byung Yoon, Seoul (KR); Hyun Sung Kim, Anyang-si (KR); Pham Cao Thanh Tung, Seoul (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 605 days.

(21) Appl. No.: 12/326,006

(22) Filed: Dec. 1, 2008

(65) Prior Publication Data

US 2009/0291046 A1 Nov. 26, 2009

(30) Foreign Application Priority Data

May 21, 2008 (KR) ........................ 10-2008-0046867

(51) Int. Cl.
*C01B 39/04* (2006.01)
*C01B 39/40* (2006.01)
(52) U.S. Cl. ..................... 423/707; 423/704; 423/709
(58) Field of Classification Search ................... 423/704, 423/705, 709, 707
See application file for complete search history.

(56) References Cited

U.S. PATENT DOCUMENTS 6,190,638 B1 *  2/2001  Anthonis et al. .............. 423/702

FOREIGN PATENT DOCUMENTS

| KR | 10-2001-0096777 | 11/2001 |
|---|---|---|
| KR | 10-2002-0034340 | 5/2002 |
| KR | 10-2005-0015373 | 2/2005 |
| KR | 10-2006-0048504 | 5/2006 |
| KR | 10-0789661 | 12/2007 |
| WO | WO 02/36340 A1 | 5/2002 |
| WO | WO 2004/110619 A1 | 12/2004 |
| WO | WO 2006/001648 A1 | 1/2006 |

OTHER PUBLICATIONS

Korean Patent Abstract, Publication No. 1020010096777, dated Nov. 8, 2001, for Korean application 10-2000-0019667 previously listed as on Order.
Korean Patent Abstract, Publication No. 1020020034340, dated May 9, 2002, for Korean application 10-2000-0064534 previously listed as on Order.
Korean Patent Abstract, Publication No. 1020050015373, dated Feb. 21, 2005, for Korean application 10-2003-0054157 previously listed as on Order.

(Continued)

*Primary Examiner* — David M Brunsman
(74) *Attorney, Agent, or Firm* — Christie, Parker & Hale, LLP (57) ABSTRACT

A b-oriented MFI zeolite membrane with variable thickness is provided. The MFI zeolite membrane is composed of zeolite crystals whose b-axes are all uniformly oriented perpendicular to a substrate. Further provided is a method for preparing the MFI zeolite membrane. The method comprises forming zeolite or zeotype molecular sieve seeds with different thicknesses on a substrate and adding the seeded substrate to a gel for the synthesis of an MFI zeolite containing a structure-directing agent to grow zeolite or zeotype molecular sieve crystals thereon. The MFI zeolite membrane overcomes the limitations of prior art zeolite membranes to maximize its applicability.

12 Claims, 5 Drawing Sheets

OTHER PUBLICATIONS

Korean Patent Abstract, Publication No. 1020060048504, dated May 18, 2006, for Korean application 10-2005-0054643 previously listed as on Order.

Corresponds to International application PCT/KR01/01854 previously listed as on Order.

Corresponds to International application PCT/KR2004/001467 previously listed as on Order.

Corresponds to International application PCT/KR2005/001960 previously listed as on Order.

Li, S., et al., *TEM Investigation of Formation Mechanism of Monocrystal-Thick b-Oriented Pure Silica Zeolite MFI Film*, Journal Am. Chem. Soc., vol. 126, (2004), pp. 10732-10737.

Yan, Y., et al., *Synthesis of Oriented Zeolite Molecular Sieve Films with Controlled Morphologies*, Chem. Mater., vol. 8, (1996), pp. 473-479.

Wang, X., et al., *Synthesis of b-Oriented TS-I Films on Chitosan-Modified $\alpha$-$Al_2O_3$ Substrates*, Advanced Materials, vol. 18, (2006), pp. 3261-3265.

Yu, H., et al., *Synthesis of b-axis oriented high silica MFI type zeolite crystals introduced with co-template role*, ScienceDirect, Microporous and Mesoporous Materials, vol. 95, (2006) pp. 234-240.

Lai, Z., et al., *Siliceous ZSM-5 Membranes by Secondary Growth of b-Oriented Seed Layers*, Adv. Funct. Mater., vol. 14, No. 7, (2004), pp. 716-729.

Zhang, F.Z., et al., *Preparation of b-oriented MFI zeolite membranes on porous $\alpha$-alumina substrates precoated with mesoporous silica sublayer*, Journal of Materials Science, vol. 40, (2005), pp. 2729-2732.

Mabande, G., et al., *Preparation of b-Oriented MFI Films on Porous Stainless Steel Substrates*, Ind. Eng. Chem. Res., vol. 44, (2005), pp. 9086-9095.

Seike, T., et al., *Preparation of b-Axis-Oriented MFI Zeolite Thin Films Using Slow Dissolution of Source Material*, J. Am. Ceram. Soc., vol. 87, No. 8, (2004), pp. 1585-1587.

Wang, Z., et al., *Oriented zeolite MFI monolayer films on metal substrates by in situ crystallization*, Microporous and Mesoporous Materials, vol. 48, (2001), pp. 229-238.

Wang, Z., et al., *Oriented films of epitaxial MFI overgrowths*, ScienceDirect, Microporous and Mesoporous Materials, vol. 95, (2006), pp. 86-91.

Gouzinis, A., et al., *On the Preferred Orientation and Microstructural Manipulation of Molecular Sieve Films Prepared by Secondary Growth*, Chem. Mater. vol. 10, (1998), pp. 2497-2504.

Lai, Z., *Microstructural Optimization of a Zeolite Membrane for Organic Vapor Separation*, Science, vol. 300, Mar. 6, 2003, pp. 456-463.

Hedlund, J., et al., *High-flux MFI membranes*, Microporous and Mesoporous Materials, vol. 52, (2002), pp. 179-189.

Hedlund, J., et al., *Controlling the preferred orientation in silicalite-1 films synthesized by seeding*, Microporous and Mesoporous Materials, vol. 28, (1999), pp. 185-194.

Wang, Z., et al., *Controlling Crystal Orientation in Zeolite MFI thin Films by Direct In Situ Crystallization*, Chem. Mater., vol. 13, (2001), pp. 1101-1107.

\* cited by examiner

FIG. 10

UNIFORMLY B-ORIENTED MFI ZEOLITE MEMBRANE WITH VARIABLE THICKNESS SUPPORTED ON SUBSTRATE AND PREPARATION METHOD THEREOF

CROSS-REFERENCE TO RELATED APPLICATION

This application claims priority of Korean Patent Application Number 10-2008-0046867, filed on May 21, 2008.

BACKGROUND OF THE INVENTION

1. Field of the Invention

The present invention relates to a method for preparing an MFI zeolite membrane, a method for controlling the thickness of an MFI zeolite membrane composed of zeolite crystals whose b-axes are all oriented perpendicular to a substrate, and an MFI membrane with variable thickness composed of zeolite crystals whose b-axes are all oriented perpendicular to a substrate.

2. Description of the Related Art

Zeolite is a generic name of a group of crystalline aluminosilicates. Since sites around aluminum bear negative charges in an aluminosilicate skeleton, cations for compensating the negative charges are present within pores of the aluminosilicate skeleton and the remaining space of the pores is usually filled with water molecules. The three-dimensional pore structure, shape and size of zeolite are depending upon the type of the zeolite, and the pore diameter is typically on a molecular scale. Therefore, zeolite is also called as a 'molecular sieve' because of its size selectivity or shape selectivity for molecules entering the pores according to the type of the zeolite.

On the other hand, many zeotype molecular sieves are known in which silicon (Si) and aluminum (Al) atoms constituting the skeletal structure of zeolite are partially or wholly replaced by various other elements. Examples of known zeotype molecular sieves include porous silicalite-based molecular sieves free of aluminum, $AlPO_4$-based molecular sieves in which silicon is replaced by phosphorus (P), and other molecular sieves in which the skeletal constituent elements are partially substituted with various metal atoms such as Ti, Mn, Co, Fe and Zn. These zeotype molecular sieves are materials derived from zeolites, and do not belong to zeolite groups based on the mineralogical classification but are commonly called as zeolites in the art. Accordingly, the term 'zeolite' as used herein is intended to include the above-mentioned zeotype molecular sieves in a broad sense.

Zeolites with an MFI structure are most actively used and include the following types:

1) ZSM-5: MFI zeolites in which silicon and aluminum are present in a specific ratio;
2) Silicalite-1: zeolites composed of silica only; and
3) TS-1: MFI zeolites in which aluminum atoms are partially replaced by titanium atoms (Ti).

Figure 1:
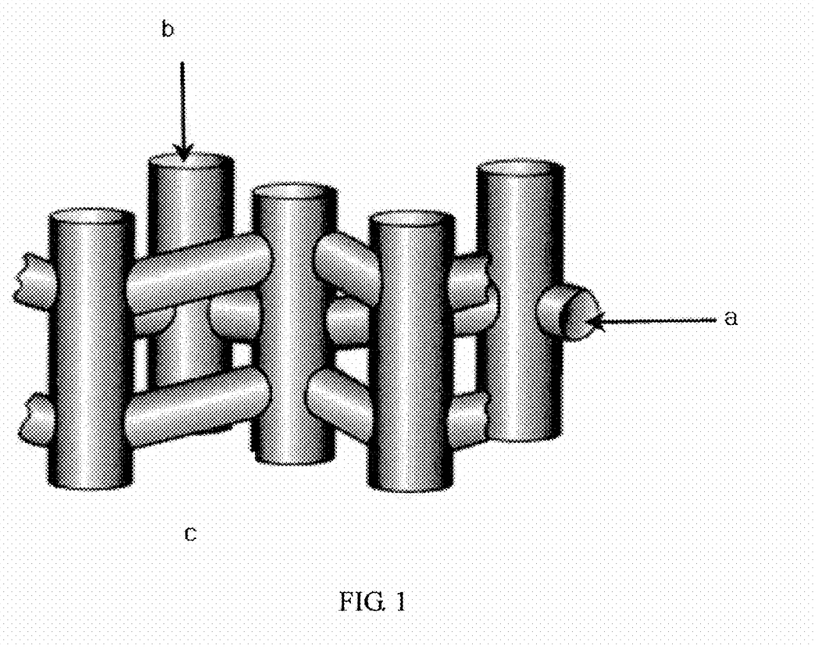
FIG. 1 is a diagram showing the structure of an MFI zeolite.

The structure of an MFI zeolite is depicted in FIG. 1. In the MFI zeolite, elliptical pores (0.51 nm×0.55 nm) are connected in a zigzag configuration in the a-axis direction to form channels, substantially circular pores (0.54 nm×0.56 mn) linearly extend in the b-axis direction to form straight channels, and no channels remain open in the c-axis direction.

Powdered MFI zeolites are very widely used in household and industrial applications, including petroleum cracking catalysts, adsorbents, dehydrating agents, ion exchangers, gas purifiers, etc. MFI zeolite membranes supported on porous substrates, such as porous alumina, are widely used as membranes through which molecules can be separated on the basis of size. Furthermore, MFI zeolite membranes can find application in a wide range of fields, for example, second- and third-order nonlinear optical thin films, three-dimensional memory materials, solar energy storage devices, electrode auxiliary materials, carriers of semiconductor quantum dots and quantum wires, molecular circuits, photosensitive devices, luminescent materials, low dielectric constant (k) thin films, anti-rusting coatings, etc.

As described above, the shape and size of pores and the structure of channels in an MFI zeolite vary depending on the direction of the zeolite crystals. Hence, the shape and size of pores and the structure of channels toward a substrate in an MFI zeolite membrane vary according to the direction of the zeolite crystals lying vertically on the substrate. That is, the characteristics of the MFI zeolite membrane are very sensitive to the planar direction of the crystals lying vertically on the substrate. For these reasons, methods for uniformly growing an MFI zeolite membrane in a specific direction, i.e. in the a- or b-axis direction, have been developed in the art. However, methods for the preparation of MFI zeolite membranes with variable thicknesses composed of zeolite crystals whose b-axes are all oriented perpendicular to substrates have not existed to date.

Methods for preparing MFI zeolite membranes on substrates such as glass plates are broadly divided into a primary growth method and a secondary growth method. According to the primary growth method, a glass plate as a substrate is dipped in a gel for the synthesis of an MFI zeolite (hereinafter also referred to as an 'MFI zeolite synthesis gel' or simply a 'synthesis gel') without any pretreatment to induce spontaneous growth of an MFI zeolite membrane on the substrate. Generally, the gel contains tetrapropylammonium hydroxide (TPAOH). In this case, b-oriented MFI zeolite crystals grow perpendicular to the substrate at the initial stage of the reaction. At this time, a-oriented crystals begin to grow parasitically from central portions of most of the crystals grown on the glass plate. With the passage of time, the crystals grow in various directions, and as a result, the final membrane has various orientations. The randomly oriented MFI zeolite membrane is useful in some applications, but its applicability is limited. Particularly, when the randomly oriented MFI zeolite membrane is applied to the separation of molecules, the molecular permeability, which is one of the most important factors in the molecular separation, is markedly reduced. When an organic base other than TPAOH is used in the primary growth method, no MFI zeolite membrane grows on the substrate. The secondary growth method is an alternative way to overcome the drawbacks of the primary growth method.

According to the secondary growth method, a substrate, to which MFI zeolite crystals are previously attached, is dipped in an MFI zeolite synthesis gel, and then the reaction is allowed to proceed to form an MFI zeolite membrane. The MFI zeolite crystals attached to the substrate act as seeds. The orientation of the MFI zeolite crystals plays an important role in determining the orientation of the MFI zeolite membrane in the subsequent step. For examples the a-axes of the MFI zeolite crystals tend to be oriented perpendicular to the substrate when the a-axes of the MFI zeolite seeds are oriented perpendicular to the substrate, while the b-axes of the MFI zeolite crystals tend to be oriented perpendicular to the substrate when the b-axes of the MFI zeolite seeds are oriented perpendicular to the substrate. The present inventors have conducted leading studies and succeeded in attaching MFI type crystals to various kinds of substrates, such as glass plates, and filed patent applications in Korea and other countries (Korean Patent Application Nos. 2000-0019667, 2000-0064534, 2003-0054157 and 10-2005-0054643, PCT/KR2001/01854, PCT/KR2004/001467, and PCT/KR2005/001960), some of which were patented.

The orientation of the final zeolite membrane is highly sensitive to an organic base of the synthesis gel rather than to the orientation of the seeds. For example, the synthesis gel typically contains TPAOH as the organic base. In this case, although the MFI zeolite seeds are oriented such that the a- or b-axes are perpendicular to the substrate, the orientation of the MFI zeolite membrane varies randomly. Further, even when all seeds are a-oriented and trimer-TPAOH (1-bis-N,N-(tripropylammoniumhexamethylene)di-N,N-tripropylammonium trihydroxide) is used as the organic base, all zeolite crystals do not uniformly grow in the a-axis direction. That is, the orientation of the seeds and the kind of the organic base contained in the synthesis gel greatly affect the orientation of the final MFI zeolite membrane.

The use of the synthesis gel containing TPAOH or trimer-TPAOH makes it difficult to freely control the thickness of the final membrane. For example, 100 nm-thick seeds are attached to the substrate, followed by secondary growth of zeolite crystals using trimer TPAOH for 24 hr to form a membrane, whose thickness is ten times larger than the initial thickness. This procedure is repeated except the use of TPAOH instead of trimer TPAOH to form a membrane whose thickness is twenty times larger than the initial thickness. That is, it is not easy to form a membrane with a desired thickness (e.g., 100 or 150 nm). In the meantime, when a zeolite membrane is used for the separation of molecules, the molecular permeability of the membrane remarkably decreases with increasing thickness of the membrane, which is economically disadvantageous. Thus, there is a need for a technique for the formation of a zeolite membrane as thin as 200 nm that is composed of uniformly oriented zeolite crystals.

Papers and patent publications are referenced and cited throughout the specification, the disclosure of which is incorporated herein by reference in its entirety in order to more clearly disclose the invention and the state of the art to which the invention pertains.

SUMMARY OF THE INVENTION

The present inventors have conducted extensive research to solve the above-mentioned problems and endeavored to develop a novel method for forming a uniformly b-oriented membrane with variable thickness from b-oriented seeds. As a result, the present inventors have found that when zeolite or zeotype molecular sieve seeds having different thicknesses were formed on a substrate and then the seeded substrate was dipped in a gel for the synthesis of an MFI zeolite containing a structure-directing agent to grow zeolite or zeotype molecular sieve crystals thereon, an MFI zeolite membrane with variable thickness was formed in which the zeolite or zeotype molecular sieve crystals were uniformly b-oriented, that is, all straight channels were arranged perpendicular to the substrate. The present inventors have found that the thickness of the membrane could be easily controlled because the formation of the membrane proceeded slowly.

The present invention has been accomplished based on these findings.

In view of the above, an object of the present invention is to provide a method for preparing an MFI zeolite membrane with variable thickness in which zeolite or zeotype molecular sieve crystals whose b-axes are all oriented perpendicular to a substrate, i.e. straight channels are oriented perpendicular to the substrate plane.

Another object of the present invention is to provide a method for controlling the thickness of an MFI zeolite membrane composed of zeolite or zeotype molecular sieve crystals whose b-axes are all oriented perpendicular to a substrate.

These and/or other objects and advantages of the invention will become apparent and more readily appreciated from the following description of the embodiments and claims.

According to an aspect of the present invention, there is provided a method for preparing a b-oriented MFI zeolite membrane, the method comprising (a) attaching zeolite or zeotype molecular sieve seeds to a substrate, and (b) adding the seeded substrate to a gel for the synthesis of an MFI zeolite containing a structure-directing agent to grow zeolite or zeotype molecular sieve crystals thereon ("a secondary growth method").

According to another aspect of the present invention, there is provided a method for controlling the thickness of a b-oriented MFI zeolite membrane, the method comprising (a) attaching zeolite or zeotype molecular sieve seeds with different thicknesses to a substrate, and (b) adding the seeded substrate to a gel for the synthesis of an MFI zeolite containing a structure-directing agent to grow zeolite or zeotype molecular sieve crystals thereon.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Preferred embodiments of the present invention will now be described in greater detail.

The term "b-oriented (or b-aligned) zeolite" as used herein refers to zeolite crystals whose b-axes are oriented vertically with respect to the plane of a substrate. The term "templates" herein while referring to crystals means organic molecules or ions used for the formation of zeolite or zeotype molecular sieve crystals. The templates are completely removed by firing after the synthesis of zeolite or zeotype molecular sieves. The spaces occupied by the templates are left as internal pores of the zeolite.

The term "molecular sieves" as used herein refers to porous materials that can separate molecules having a desired size from a mixture of molecules having different sizes passing therethrough. The term "zeotype molecular sieves" refers to zeolites in which constituent silicon (Si) and aluminum (Al) atoms of the skeletal structure are partially or wholly replaced by various other elements.

The term "zeolite" refers collectively to a group of (i) minerals such as aluminum silicate hydroxides of alkali metals and alkaline earth metals, and is intended to include (ii) zeotype molecular sieves in which silicon (Si) and aluminum (Al) atoms of zeolite are partially or wholly replaced by various other elements in a narrow sense, and include (iii) all porous oxides and sulfides having surface hydroxyl groups in a broad sense.

The present invention provides a method for preparing an MFI zeolite membrane. Specifically, the method of the present invention comprises (a) attaching zeolite or zeotype molecular sieve seeds to a substrate, and (b) adding the seeded substrate to a gel for the synthesis of an MFI zeolite containing a structure-directing agent to grow zeolite or zeotype molecular sieve crystals thereon ("a secondary growth method"). No particular limitation is imposed on the skeletal composition of the MFI zeolite. In a preferred embodiment, the zeolite or zeotype molecular sieves are selected from the group consisting of ZSM-5, silicalite, TS-1, AZ-1, Bor-C, boralite C, encilite, FZ-1, LZ-105, monoclinic H-ZSM-5, mutinaite, NU-4, NU-5, TSZ, TSZ-III, TZ-01, USC-4, USI-108, ZBH and ZKQ-1B.

The molecular sieves are chemically and physically bound to the substrate. The "substrate" used in the method of the present invention is a porous or non-porous support. The term "substrate" as used herein means a film or support capable of supporting a membrane prepared by the method of the present invention.

Examples of preferred substrates suitable for use in the present invention include: 1) oxides containing at least one metal or non-metal element selected from silicon (Si), aluminum (Al), titanium (Ti), fluorine (F), tin (Sn) and indium (In), such as quartz, mica, glass, indium tin oxide (ITO)-deposited glass, tin oxide ($SnO_2$), conductive glass (e.g., F-doped tin oxide), silica, porous silica, porous alumina, titanium dioxide, porous titanium dioxide, and silicone wafers; 2) non-porous and porous non-metals, metals and metal alloys composed of one or more elements, such as silicon (Si), aluminum (Al), titanium (Ti), iron (Fe), tin (Sn), gold (Au), silver (Ag), platinum (Pt) and stainless steel; 3) metals (such as gold, silver, copper and platinum) bonded to at least one thiol (—SH) or amine (—$NH_2$) group; 4) polymers having various surface functional groups, such as polyvinyl chloride (PVC) and Merrifield peptide resins; 5) semiconductors, such as zinc selenide ZnSe, gallium arsenide (GaAs) and indium phosphide (InP); 6) natural and synthetic zeolites and porous zeotype molecular sieves; and 7) natural polymers, such as cellulose, starch (amylose and amylopectin) and lignin, synthetic polymers, and conductive polymers.

More preferred substrates are various forms of oxides containing one or more porous and non-porous metals, alloys, metals and non-metal elements. Still more preferred are quartz, mica, glass, indium tin oxide glass, tin oxide, conductive glass (e.g., F-doped tin oxide), and silica. Glass is most preferred.

In a preferred embodiment, step (a) is carried out by i) dipping the substrate in an MFI zeolite synthesis gel for a time sufficient to allow monolayer crystals to form on the substrate (a primary growth method). More preferably, step (a) is carried out by ii) attaching zeolite or zeotype molecular sieve seeds in the b-axis direction to the substrate.

In the latter case, a physical force is applied to the zeolite or zeotype molecular sieve seeds against the substrate to create chemical bonds therebetween.

The physical force is preferably applied by rubbing or pressing the molecular sieve crystals against the substrate. Rubbing is more preferred. Pressing of the molecular sieve seeds against the substrate surface and forced surface migration of the molecular sieve seeds during rubbing are the most important factors that induce bonding and close packing between the molecular sieve seeds and the substrate.

The application of a physical force to the molecular sieve seeds for the production of substrate/molecular sieve composites can be conducted by suitable methods known in the art. For example, bare hands, a rubbing tool (e.g., an elastic plate) or a rubbing machine may be used to apply a pressure to the molecular sieve seeds.

In an alternative embodiment, the zeolite or zeotype molecular sieve seeds may be attached to the substrate by sonication at 10 kHz to 100 MHz. In the present invention, the sonication is performed using ultrasonic waves in an available frequency range known in the art, preferably 10 kHz-100 MHz, more preferably 15 kHz-10 MHz, still more preferably 20 kHz-10 MHz and most preferably 25 kHz-1000 kHz. Out of this range, the molecular sieve particles are not satisfactorily bonded to the substrate. Further, a power may be variable within an appropriate range according to the frequency. The sonication time may vary, preferably from 30 sec to 10 min, more preferably from 1 min to 5 min, and most preferably from 1 min to 3 min. The sonication temperature may be within a general chemical reaction temperature range, preferably from 20 to 50° C., more preferably from 20 to 40° C., and most preferably at room temperature.

In a preferred embodiment, the substrate may be linked to the zeolite seeds by hydrogen bonding. In this case, the substrate may be either hydrogen bonded directly to the zeolite seeds or linked to the zeolite seeds via a hydrogen-bonding mediator (e.g., polyethyleneimine).

In another preferred embodiment, a linker (or a linking compound) may be bonded to the substrate or the zeolite or zeotype molecular sieve seeds. The term 'linker (or linking compound)' used herein refers to any compound having at least one terminal functional group through which the substrate can be bonded to the molecular sieve crystals.

Preferably, the linking compound is represented by any one of Formulae 1 to 11:

(1)

(2)

(3)

(4)

(5)

(6)

Z-L2(+)  (7)

L3(−)-Y  (8)

Z-L3(−)  (9)

L2(+)-Y  (10)

Z-Y  (11)

wherein Z is $R_3Si$ or an isocyanate group (—NCO) (R=halo, $C_1$-$C_4$ alkoxy or $C_1$-$C_4$ alkyl, with the proviso that at least one of three R is halo or alkoxy); L1 is a substituted or unsubstituted $C_1$-$C_{17}$ alkyl, aralkyl or aryl group which may contain at least one heteroatom selected from oxygen, nitrogen and sulfur atoms; X is a halogen, isocyanate (—NCO), tosyl or azide group; R' has the same meaning as R, with the proviso that at least two of four R' are independently halo or alkoxy; M is silicon, titanium or zirconium; Y is hydroxyl, thiol, amine, ammonium, sulfone or its salt, carboxylic acid or its salt, acid anhydride, epoxy, aldehyde, ester, acrylate, isocyanate (—NCO), sugar residue, double bond, triple bond, diene, diyne, alkyl phosphine, alkyl amine or a ligand-exchangeable coordination compound, and may be positioned at the terminals or in the middle of the linking compound; L2(+) is a substituted or unsubstituted $C_1$-$C_{17}$ hydrocarbon compound containing at least one heteroatom selected from oxygen, nitrogen and sulfur atoms and having a functional group bearing at least one cation (+) at the terminal or main or side chain thereof; and L3(−) is a substituted or unsubstituted $C_1$-$C_{17}$ hydrocarbon compound containing at least one heteroatom selected from oxygen, nitrogen and sulfur atoms and having a functional group bearing at least one anion (−) at the terminal or main or side chain thereof.

Ionic bonding is typically involved in the bonding of the substrate and the molecular sieve crystals through the linking compound. For example, an intermediate (linking compound/molecular sieve crystals) is rubbed against an intermediate (substrate/linking compound) to create a stable ionic bond between the linking compounds of the intermediates.

The substrate/molecular sieve composites can be prepared in different manners depending on the kinds of the substrate and the molecular sieve particles (i.e. crystals), the kinds of the linking compounds of the intermediates, etc.

Representative types of the linking between the substrate and the molecular sieves are as follows:

1) Substrate/Molecular Sieve Composites

The composites are prepared by bonding the molecular sieve seeds to the substrate under pressure. No linking compound is used, and the molecular sieve seeds are linked to the substrate by hydrogen bonding;

2) Substrate/Hydrogen-Bonding Mediator/Molecular Sieve Composites

The composites are prepared by coating the surface of the substrate and/or the surface of the molecular sieve crystals with a suitable hydrogen-bonding mediator, and pressing the molecular sieve seeds against the substrate surface. The coating is conducted by spin coating and dip coating. The hydrogen bonds of the composites are stronger and more stable compared to those of the composites 1);

3) Substrate/Linking Compound/Molecular Sieve Composites

The composites are prepared by bonding a suitable linking compound to the surface of the substrate and/or the surface of the molecular sieve crystals, and pressing the molecular sieve seeds against the substrate surface;

4) Substrate/Linking Compound/Linking Compound/Molecular Sieve Composites

The composites are prepared by bonding the substrate to a linking compound (Intermediate 1), bonding the molecular sieve crystals to another linking compound (Intermediate 2), followed by rubbing to bond the two intermediates together. The linking compounds of Intermediates 1 and 2 are required to have functional groups capable of being bonded to each other. For example, the linking compounds are bonded by ionic bonding between an ammonium group and a carboxylic acid group or its salt); and 5) Substrate/Linking Compound/Linking Compound/Linking Compound/Molecular Sieve Composites

The composites are prepared by bonding the substrate to a first linking compound (Intermediate 1), bonding the molecular sieve crystals to a second linking compound (Intermediate 2), adding a third linking compound to the mixture of Intermediates 1 and 2, and linking the Intermediates 1 and 2 through the third linking compound by rubbing. Alternatively, the third linking compound may be sequentially bonded to Intermediates 1 (or 2) and 2 (or 1).

The method of the present invention is characterized in that an MFI zeolite membrane with variable thickness can be grown. The MFI zeolite membrane is prepared using seeds with different thicknesses in the b-axis direction when the zeolite or zeotype molecular sieve seeds are attached to the substrate. According to prior art methods, it is impossible to form membranes as thin as 200 nm. In contrast, according to the method of the present invention, a membrane as thin as 200 nm can be prepared, and is therefore suitable for use in a molecular separation membrane due to its greatly improved permeability (i.e. efficiency).

In step (b), the seeded substrate is added to a gel for the synthesis of an MFI zeolite containing a structure-directing agent to grow zeolite or zeotype molecular sieve crystals thereon.

In a preferred embodiment, the structure-directing agent is an amine, an imine or a quaternary ammonium salt.

More preferably, the structure-directing agent is a quaternary ammonium hydroxide represented by Formula 12:

(12)

wherein $R_1$, $R_2$, $R_3$ and $R_4$ are each independently a hydrogen atom or a $C_1$-$C_{30}$ alkyl, aralkyl or aryl group which may contain at least one heteroatom selected from oxygen, nitrogen, sulfur, phosphorus and metal atoms. TPAOH and trimer-TPAOH are excluded from Formula 12.

The term "$C_1$-$C_{30}$ alkyl" in Formula 12 represents a linear or branched saturated hydrocarbon group consisting of 1 to 30 carbon atoms, and examples thereof include methyl, ethyl, propyl, isobutyl, pentyl, hexyl, heptyl, octyl, nonyl, decyl, undecyl, tridecyl, pentadecyl and heptadecyl. Preferred is $C_1$-$C_4$ linear or branched alkyl.

The term "aralkyl" represents an aryl group bonded to one or more alkyl groups, and is preferably benzyl.

The term "aryl" represents a substituted or unsubstituted monocyclic or polycyclic carbon ring which is wholly or partially unsaturated, and is preferably monoaryl or biaryl. It is preferred that the monoaryl has 5 or 6 carbon atoms and the biaryl has 9 or 10 carbon atoms. Most preferred is substituted or unsubstituted phenyl.

In addition to the structure-directing agent, the synthesis gel further contains the following materials:

1) Aluminum (Al) materials, for example, organic-inorganic composite materials (e.g., aluminum isopropoxide) composed of aluminum and an organic material bonded to the aluminum, aluminum salts (e.g., aluminum sulfate), pure aluminum materials in the form of powder or lump, aluminum oxides (e.g., alumina), etc;

2) Silicon (Si) materials, for example, organic-inorganic composite materials (e.g., tetraethylorthosilicate (TEOS)) composed of silicon and an organic material bonded to the silicon, silicon salts (e.g., sodium silicalite), pure silicon materials in the form of powder or lump, glass powders, silicon oxides (e.g., quartz), etc;

3) Fluorine (F) materials, for example, all materials (HF, $NH_4F$, NaF and KF) containing $F^-$; and 4) Materials used to incorporate elements other than aluminum and silicon into the skeleton of zeolite.

In a preferred embodiment, the synthesis gel containing the structure-directing agent has the composition $[TEOS]_X$ $[TEAOH]_Y[(NH_4)_2SiF_6]_Z[H_2O]_W$. The ratio X:Y:Z:W is 0.1-30:0.1-50:0.01-50:1-500, preferably 0.5-15:0.5-25:0.05-25:25-400, more preferably 1.5-10:1.0-15:0.1-15:40-200, and most preferably 3-6:1.5-5:0.2-5:60-100. Out of this range, zeolite crystals whose b-axes are uniformly oriented perpendicular to the substrate cannot be formed. In addition to these components, the synthesis gel may additionally contain at least one element selected from, but not limited to, transition metals such as titanium, Group 13 elements such as gallium, and Group 14 elements such as germanium. The proportion of the additional component is limited to 0.1 to 30.

The reaction temperature for the preparation of the membrane may vary from 50 to 250° C., preferably from 80 to 200° C. and more preferably from 120 to 180° C., depending on the composition of the gel or the material to be prepared using the gel. The reaction temperature is not always fixed and may vary stepwise.

The reaction time for the preparation of the membrane may vary from 0.5 hr to 20 days, preferably from 2 hr to 15 days, more preferably 6 hr to 2 days, and most preferably 10 hr to one day.

The MFI zeolite membrane prepared by the method of the present invention is distinguished from conventional zeolite membranes in that the MFI zeolite membrane is uniformly b-oriented. In a preferred embodiment, the b-oriented MFI zeolite membrane supported on the substrate is characterized in that all b-axes (i.e. all straight channels) of zeolite crystals are oriented perpendicular to the substrate. The structure of an MFI zeolite is depicted in FIG. 1. Channels in the zeolite or zeotype molecular sieve crystals consist of straight channels and sinusoidal channels. Thus, the expression "channels are aligned in the single direction" means that each of the straight channels and sinusoidal channels has a single orientation. The directivity of the straight channels may be identical to or different from that of the sinusoidal channels. Specifically, the b-axis orientation of the crystals with respect to the substrate means that the straight channels of the supercrystals are perpendicular to the substrate plane and the sinusoidal channels are perpendicular or parallel to the substrate plane.

The MFI membrane composed of zeolite and zeotype molecular sieve crystals has the following macroscopic structures:

1) A single film of molecular sieves in a monolayer structure directly grown on a substrate;

2) A single film of one or more kinds of molecular sieves in a multilayer structure on a substrate;

3) A monolayer or multilayer film of one or more kinds of molecular sieves attached to a substrate by chemical bonding; and 4) Composites in which some or all of the structures of 1), 2) and 3) are combined.

In another aspect, the present invention provides an MFI zeolite membrane prepared by the method. Specifically, the MFI zeolite membrane is composed of zeolite crystals whose b-axes (i.e. straight channels) are all oriented perpendicular to a substrate. The thickness of the MFI zeolite membrane may be variable. For example, the MFI zeolite membrane may possess a thickness of 200 nm or less and its molecular permeability is high. There is no restriction on the application of the MFI zeolite membrane according to the present invention. For example, the MFI zeolite membrane can find application in molecular separation membranes, low dielectric constant materials in the semiconductor industry, nonlinear optical materials, membranes for water electrolysis, thin films for solar cells, optical materials and parts, interior and exterior components and parts for aircraft, cosmetic containers, household containers, mirrors, and other membranes utilizing the characteristics of nanopores of zeolite.

Hereinafter, the present invention will be explained in more detail with reference to the following examples. However, it will be obvious to those skilled in the art that these examples serve to provide further appreciation of the invention in all aspects but are not meant in any way to restrict the scope of the invention.

EXAMPLES

Materials and Methods

Preparation for Growth of Uniformly B-Oriented Silicalite Membrane on Glass Plate A glass plate (75 mm×25 mm×1 mm, Marienfeld) was immersed in a piranha solution ($H_2SO_4/H_2O_2$ (7:3)) for 30 minutes. The glass plate was taken out of the solution, washed with distilled water, and dried under a stream of high-purity nitrogen. The dry glass plate was placed on a spin coater and coated with a dilute solution of polyethyleneimine (PEI, $M_W$=25,000, Aldrich) in alcohol. The coated glass (PEI/G) plate was washed with pure toluene and dried by blowing high-purity nitrogen.

Preparation of Silicalite Monolayer Membrane by Rubbing or Sonication

After the PEI/G plate was affixed to filter paper or A4 paper using a double-sided adhesive tape on a flat plate, a small amount of a silicalite powder having a broad and flat surface in the b-axis direction was sprayed thereon. The powder was attached to the surface of the PEI/G plate by rubbing with fingers or an elastic silicone material having a soft and smooth surface (see Korean Patent Application No. 2007-0001317) or by using ultrasonic waves (see Korean Patent No. 668041). As a result, all b-axes of the silicalite seeds were oriented perpendicular to the substrate. Before spraying the silicalite powder, the glass plate was reacted with 3-chloropropyltrimethoxysilane in toluene to previously attach (coat) 3-chloropropyl groups to the glass surface. The 3-chloropropyl groups served as linkers to attach the silicalite to the glass surface. The silicalite seeds used during sonication were pure silicalite crystals in which no parasitic crystals were grown in the a-axis direction from the central portions.

Preparation of Gel for Growth of Uniformly b-Oriented Silicalite Membrane 30.29 g of tetraethylammonium hydroxide (TEAOH, 35 wt % aqueous solution, Aldrich) and 33.24 g of water were sufficiently stirred in a 200 mL plastic beaker. 40 g of the TEAOH solution was transferred to a 100 mL plastic beaker, and then 31.80 g of tetraethylorthosilicate (TEOS, 98%, Aldrich) was added thereto. The mixture was stirred at room temperature for 4 hr to hydrolyze the TEOS. The remaining portion of the TEAOH solution was transferred to a 100 mL plastic beaker, and then 2.45 g of 98% ammonium hexafluorosilicate $[(NH_4)_2SiF_6]$ was added thereto. After the $(NH_4)_2SiF_6$ was completely dissolved, the solution was slowly added to the solution containing the hydrolyzed TEOS. The resulting mixture was allowed to stand at room temperature for 6 hr to give a gel for the growth of a silicalite membrane. The gel was found to have the composition $[TEOS]_x[TEAOH]_y[(NH_4)_2SiF_6]_z[H_2O]_w$ (x:y:z:w=4:1.92:0.36:78.4).

Growth of Silicalite Membrane

The PEI/G plate, in which all b-axes of the silicalite seeds were oriented perpendicular to the substrate, was heated to 450° C. to fire the PEI linking layer between the silicalite and the glass plate. As a result of the heating, the silicalite was directly bonded to the glass plate. The glass plate, to which the silicalite was strongly attached, was introduced into a 180 mL Teflon container while holding the glass plate vertically using a Teflon support, and the synthesis gel was poured into the container. After the container lid was closed, the container was charged into a stainless steel autoclave. The silicalite was allowed to react with the synthesis gel in an oven at 165° C. for 12 hr to form a film. After completion of the reaction, the resulting structure was dipped in double distilled water, washed in an ultrasonic bath for 10 seconds, cleaned several times under a flow of double distilled water to remove impurities physically adhered to the surface, and fired at 550° C. for 6 hr to completely remove the organic templates from the pores.

Thickness Control of Uniformly B-Oriented Silicalite Membrane

The above procedure was repeated except that silicalite seeds having different thicknesses (20-5,000 nm) in the b-axis direction were attached to the PEI/G plate.

Scanning Electron Microscopy (SEM)

Platinum/palladium was coated to a thickness of about 15 nm on the silicalite membrane with variable thickness, and images of the coated silicalite membrane were taken using a scanning electron microscope (Hitachi S-4300 FE-SEM).

X-Ray Powder Diffraction (XRD) Analysis

To identify the crystal growth direction of the silicalite membrane, a CuKα X-ray diffractometer (Rigaku diffractometer D/MAX-1C, Rigaku) was used to obtain an X-ray powder diffraction pattern of the silicalite membrane.

Experimental Results

Figure 2:
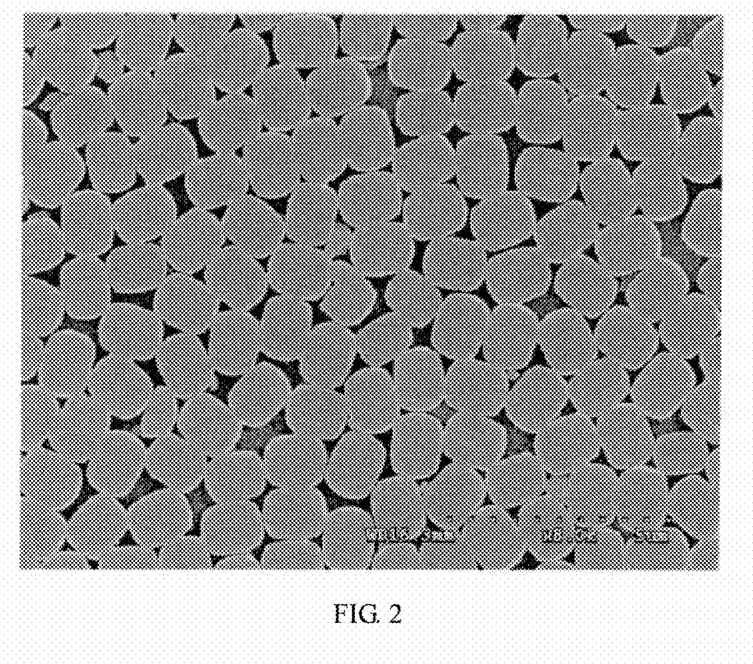
FIG. 2 is an electron micrograph (top view) of silicalite seeds attached to a glass plate by rubbing, in which the b-axes of the silicalite seeds were oriented perpendicular to the glass plate (see Korean Patent No. 0789661)

FIG. 2 is an electron micrograph (top view) of the silicalite seeds attached to the glass plate by rubbing, in which the b-axes of the silicalite seeds were oriented perpendicular to the glass plate.

Figure 3:
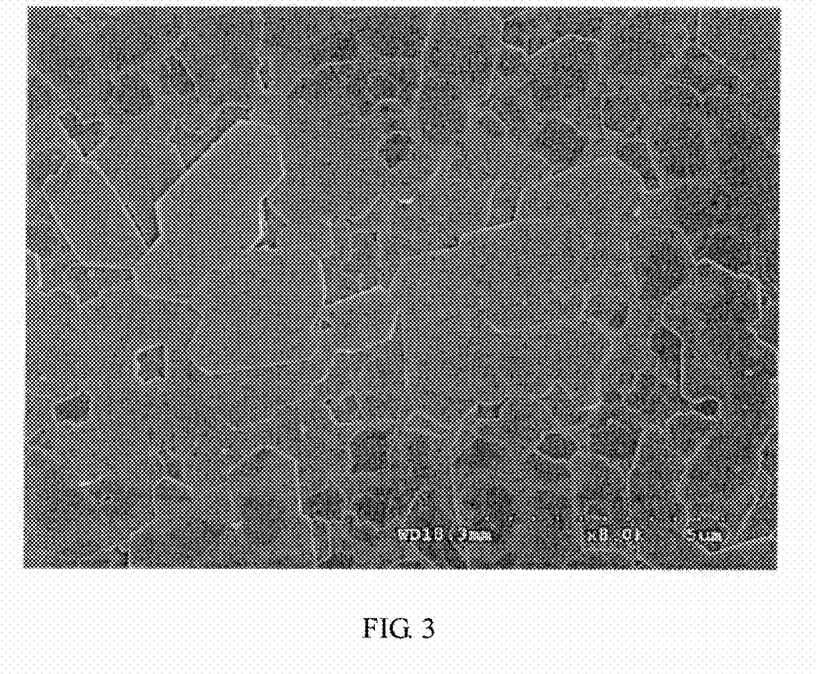
FIG. 3 is an electron micrograph (top view) of a silicalite membrane prepared by the reaction of the seeds of FIG. 2 with a reaction gel developed by the present inventors for 12 hr.
Figure 4:
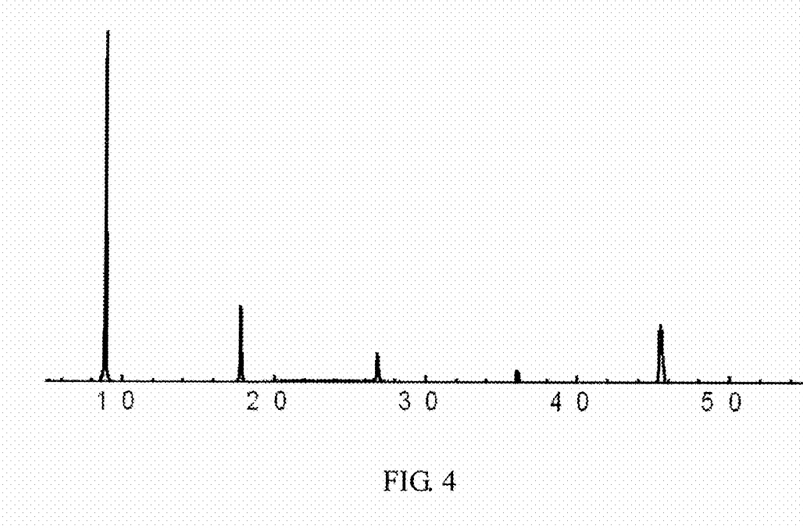
FIG. 4 is an X-ray diffraction pattern of the silicalite membrane of FIG. 3.
Figure 5:
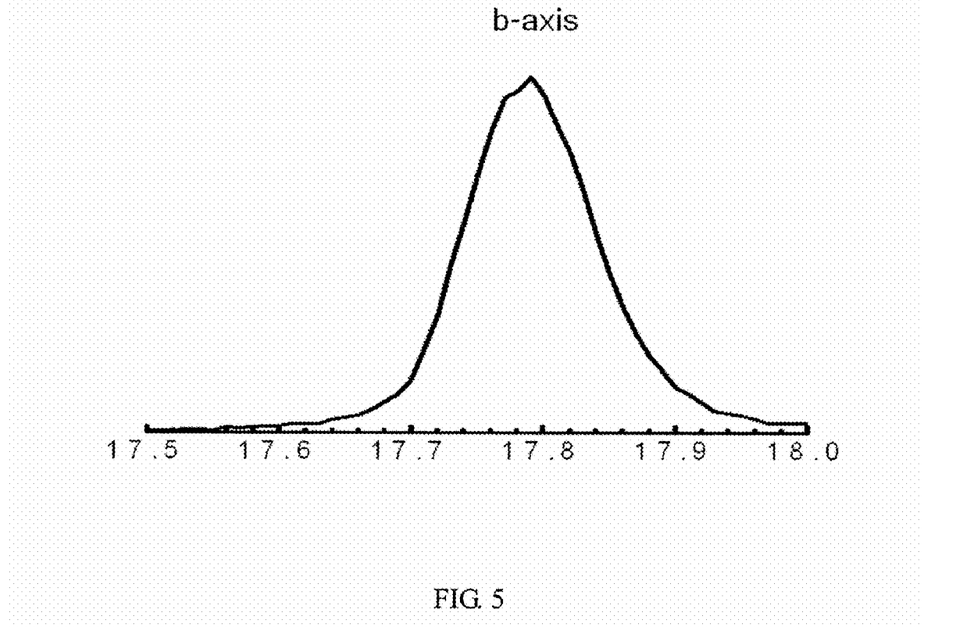
FIG. 5 is a partial enlargement ($17.5° \leq 2\theta \leq 18°$) of the diffraction pattern of FIG. 4.

FIG. 3 is an electron micrograph (top view) of the silicalite membrane prepared by the reaction of the seeds with the synthesis gel for 12 hr, and FIG. 4 is an X-ray diffraction pattern of the silicalite membrane. The analytical results of FIG. 4 show that all b-axes of the grown crystals were oriented perpendicular to the substrate. FIG. 5 is a partial enlargement ($17.5° \leq 2\theta \leq 18°$) of the diffraction pattern of FIG. 4. A peak was observed at 17.8°, which is a decisive proof that all b-axes of the silicalite crystals were oriented perpendicular to the substrate.

Figure 6:
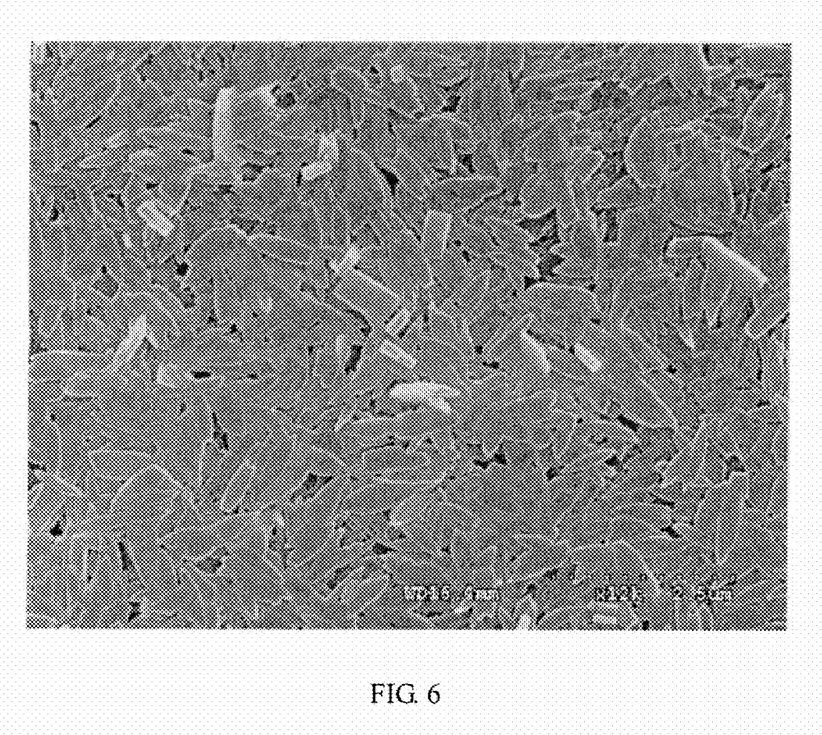
FIG. 6 is an electron micrograph (top view) of a silicalite membrane grown from the seeds of FIG. 2 using a gel containing trimer TPAOH.
Figure 7:
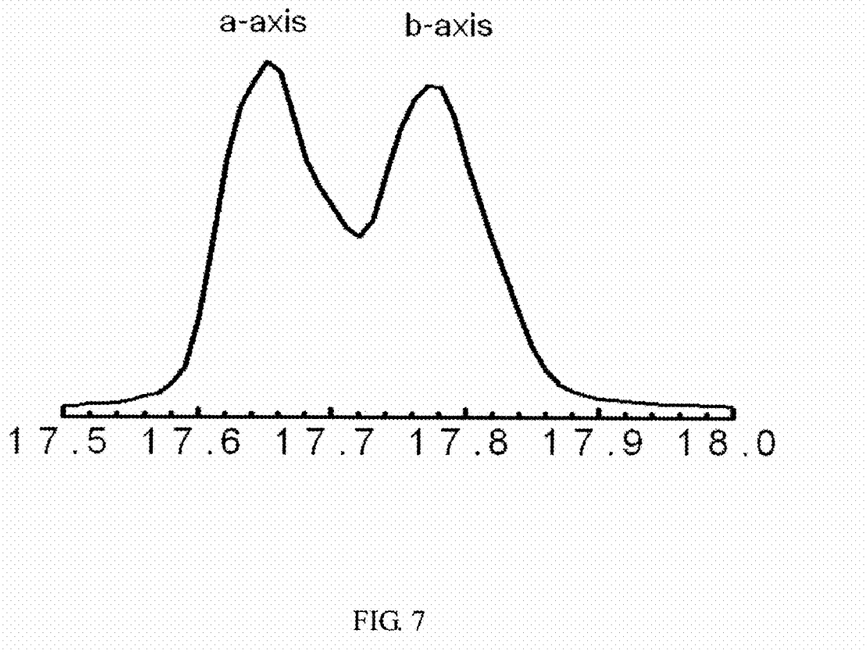
FIG. 7 is a partial enlargement ($17.5° \leq 2\theta \leq 18°$) of an X-ray diffraction pattern of the silicalite membrane of FIG. 6.

The seeds of FIG. 2 were grown using a gel containing trimer TPAOH in accordance with the prior art to form a silicalite membrane. An electron micrograph of the silicalite membrane is shown in FIG. 6. The image shows that the crystals were grown in the a-axis direction as well as in the b-axis direction. FIG. 7 is a partial enlargement ($17.5° \leq 2\theta \leq 18°$) of an X-ray diffraction pattern of the silicalite membrane. In FIG. 7, the peaks at 7.65° and 17.79° indicate growth of the silicalite crystals in the a- and b-axis directions, respectively. These results lead to the conclusion that some silicalite crystals were grown in the a-axis direction from the silicalite seeds whose b-axes were uniformly oriented perpendicular to the substrate by the use of the gel containing trimer TPAOH.

Figure 8:
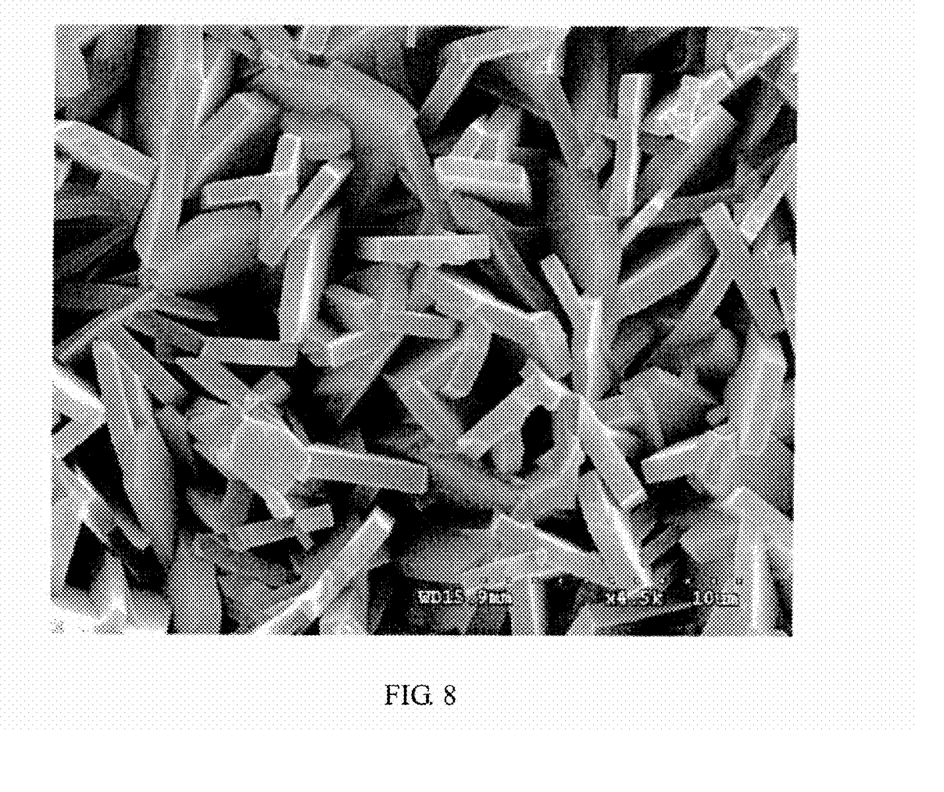
FIG. 8 is an electron micrograph (top view) of a silicalite membrane grown from the seeds of FIG. 2 using a gel containing TPAOH.
Figure 9:
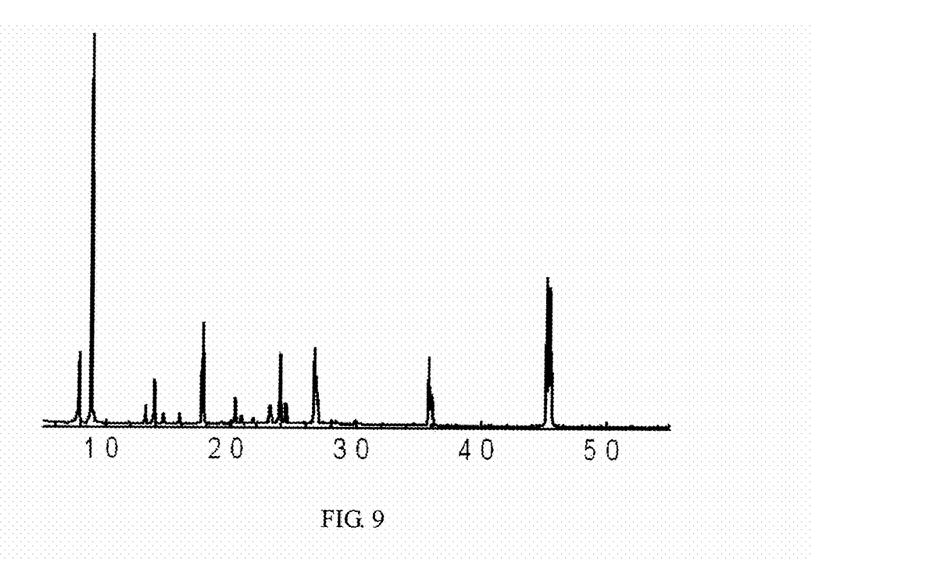
FIG. 9 is an X-ray diffraction pattern of the silicalite membrane of FIG. 8.

The seeds of FIG. 2 were grown using a gel containing TPAOH in accordance with the prior art to form a silicalite membrane. An electron micrograph (top view) of the silicalite membrane is shown in FIG. 8. The image shows the growth of the silicalite crystals in different axis directions. FIG. 9 shows the results of X-ray diffraction analysis for the silicalite membrane of FIG. 8. From the results of FIG. 9, it can be seen that the axes of the silicalite crystals were oriented perpendicular to the substrate.

Figure 10:
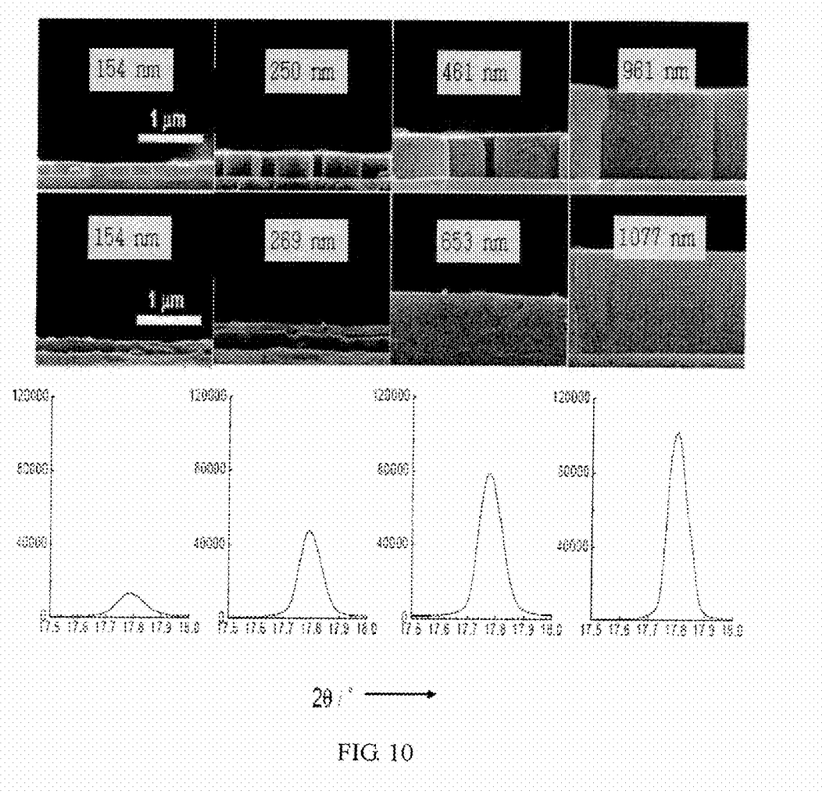
FIG. 10 shows electron micrographs (side views) of a silicalite membrane prepared by attaching silicalite seeds of different thicknesses to a glass plate such that the b-axes of the silicalite seeds were oriented perpendicular to the glass plate and reacting the seeded glass plate with a reaction gel developed by the present inventors for 12 hr (upper: before the reaction, middle: after the reaction), and X-ray diffraction patterns of the silicalite membrane samples at $2\theta$ of 17.5°-18° (lower).

Silicalite seeds with different thicknesses were attached to a glass plate such that the b-axes of the silicalite seeds were oriented perpendicular to the glass plate, and reacted with a reaction gel developed by the present inventors for 12 hr to form a silicalite membrane. FIG. 10 shows electron micrographs (side views) of the seeded glass plate before the reaction (upper) and the silicalite membrane after the reaction (middle), and X-ray diffraction patterns of the silicalite membrane samples at 2θ of 17.5-18° (lower). In each pattern, only one peak representing the b-axis was observed. FIG. 10 confirms that the use of the reaction gel enabled the preparation of the silicalite membrane with variable thickness.

While the invention has been particularly described with respect to specified embodiments, it will be evident to those skilled in the art that the invention is not to be construed as being limited to the embodiments. Therefore, the true scope of the invention should be defined by the appended claims and their equivalents.

As is apparent from the above description, the present invention has the following advantages and distinctive features.

A conventional MFI membrane prepared using TPAOH or trimer-TPAOH as a structure-directing agent is composed of crystals whose b-axes are all not oriented perpendicular to a substrate. In contrast, the MFI zeolite membrane of the present invention is composed of zeolite crystals whose b-axes (i.e. straight channels) are all aligned perpendicular to a substrate. Therefore, the present invention can overcome the drawbacks arising from non-uniform orientation of the crystals in the conventional MFI membrane.

In addition, the thickness of the b-oriented MFI zeolite membrane according to the present invention is variable up to 200 nm or less.

Furthermore, the b-oriented MFI zeolite membrane of the present invention is highly transparent when a transparent substrate is used. Various functional molecules, polymers, metal nanoparticles, semiconductor quantum dots and quantum wires, etc. can be included in the specific direction in the nanochannels of the MFI zeolite membrane. Therefore, the MFI zeolite membrane is very useful as an advanced optical, electronic and optoelectronic material. Particularly, the b-oriented MFI zeolite membrane of the present invention grown on porous alumina, porous silicalite or a mesoporous material functions as a membrane for the separation of molecules.

An MFI membrane is commonly used as a molecular separation membrane whose efficiency (i.e. permeability) greatly increases with decreasing thickness. Prior art membranes have a thickness larger 200 nm, whereas the MFI zeolite membrane of the present invention is as thin as 200 nm. Therefore, the MFI zeolite membrane of the present invention is very useful as a molecular separation membrane.

What is claimed is:

1. A method for preparing a b-oriented MFI zeolite membrane, the method comprising adding a substrate to a gel for the synthesis of an MFI zeolite containing a structure-directing agent to grow zeolite or zeotype molecular sieve crystals thereon, wherein the synthesis gel containing the structure-directing agent has the composition $[TEOS]_X[TEAOH]_Y[(NH_4)_2SiF_6]_Z[H_2O]_W$ wherein X:Y:Z:W=0.1-30:0.1-50:0.01-50:1-500.

2. A method for preparing a b-oriented MFI zeolite membrane, the method comprising
   (a) forming or attaching zeolite or zeotype molecular sieve seeds on a substrate, and
   (b) adding the seeded substrate to a gel for the synthesis of an MFI zeolite containing a structure-directing agent to grow zeolite or zeotype molecular sieve crystals thereon, wherein the synthesis gel containing the structure-directing agent has the composition $[TEOS]_X[TEAOH]_Y[(NH_4)_2SiF_6]_Z[H_2O]_W$ wherein X:Y:Z:W=0.1-30:0.1-50:0.01-50:1-500.

3. A method for controlling the thickness of a b-oriented MFI zeolite membrane, the method comprising
   (a) forming zeolite or zeotype molecular sieve seeds with different thicknesses on a substrate, and
   (b) adding the seeded substrate to a gel for the synthesis of an MFI zeolite containing a structure-directing agent to grow zeolite or zeotype molecular sieve crystals thereon, wherein the synthesis gel containing the structure-directing agent has the composition $[TEOS]_X[TEAOH]_Y[(NH_4)_2SiF_6]_Z[H_2O]_W$ wherein X:Y:Z:W=0.1-30:0.1-50:0.01-50:1-500.

4. The method of claim 2 or 3, wherein the zeolite or zeotype molecular sieve seeds are attached in the b-axis direction in step (a).

5. The method of claim 2 or 3, wherein the zeolite or zeotype molecular sieves are selected from the group consisting of ZSM-5, silicalite, TS-1, AZ-1, Bor-C, boralite C, encilite, FZ-1, LZ-105, monoclinic H-ZSM-5, mutinaite, NU-4, NU-5, TSZ, TSZ-III, TZ-01, USC-4, USI-108, ZBH and ZKQ-1B.

6. The method of claim 2 or 3, wherein the substrate is i) an oxide containing at least one metal or non-metal element and having at least one hydroxyl group on the surface thereof, ii) a metal or a metal alloy bonded to at least one thiol (—SH) and amine (—NH$_2$) group, iii) a polymer having functional groups on the surface thereof, iv) a semiconductor compound, v) zeolite or zeotype molecular sieves, or vi) a natural, synthetic or conductive polymer having surface hydroxyl groups or capable of being modified to have surface hydroxyl groups.

7. The method of claim 2 or 3, wherein a physical force is applied to the zeolite or zeotype molecular sieve seeds against the substrate to create chemical bonds therebetween in step (a).

8. The method of claim 7, wherein the physical force is applied by rubbing or pressing of the molecular sieve crystals against the substrate.

9. The method of claim 7, wherein the substrate is bonded to the zeolite or zeotype molecular sieve seeds through a linking compound.

10. The method of claim 9, wherein the linking compound is selected from the group consisting of compounds represented by Formulae 1 to 11:

$$Z\text{-}L1\text{-}X \quad (1)$$

$$MR'_4 \quad (2)$$

$$R_3Si\text{-}L1\text{-}Y \quad (3)$$

$$HS\text{-}L1\text{-}X \quad (4)$$

$$HS\text{-}L1\text{-}SiR_3 \quad (5)$$

$$HS\text{-}L1\text{-}Y \quad (6)$$

$$Z\text{-}L2(+) \quad (7)$$

$$L3(-)\text{-}Y \quad (8)$$

$$Z\text{-}L3(-) \quad (9)$$

$$L2(+)\text{-}Y \quad (10)$$

$$Z\text{-}Y \quad (11)$$

wherein Z is R$_3$Si or an isocyanate group (—NCO) (R=halo, C$_1$-C$_4$ alkoxy or C$_1$-C$_4$ alkyl, with the proviso that at least one of three R is halo or alkoxy); L1 is a substituted or unsubstituted C$_1$-C$_{17}$ alkyl, aralkyl or aryl group which optionally contains at least one heteroatom selected from oxygen, nitrogen and sulfur atoms; X is a halogen, isocyanate (—NCO), tosyl or azide group; R' has the same meaning as R, with the proviso that at least two of four R' are independently halo or alkoxy; M is silicon, titanium or zirconium; Y is hydroxyl, thiol, amine, ammonium, sulfone or its salt, carboxylic acid or its salt, acid anhydride, epoxy, aldehyde, ester, acrylate, isocyanate (—NCO), sugar residue, double bond, triple bond, diene, diyne, alkyl phosphine, alkyl amine or a ligand-exchangeable coordination compound, and is positioned at the terminals or in the middle of the linking compound; L2(+) is a substituted or unsubstituted C$_1$-C$_{17}$ hydrocarbon compound containing at least one heteroatom selected from oxygen, nitrogen and sulfur atoms and having a functional group bearing at least one cation (+) at the terminal or main or side chain thereof, and L3(-) is a substituted or unsubstituted C$_1$-C$_{17}$ hydrocarbon compound containing at least one heteroatom selected from oxygen, nitrogen and sulfur atoms and having a functional group bearing at least one anion (-) at the terminal or main or side chain thereof.

11. The method of claim 2 or 3, wherein the zeolite or zeotype molecular sieve seeds are attached to the substrate by sonication at 10 kHz to 100 MHz.

12. An MFI zeolite membrane prepared by the method of claim 2 or 3 and composed of zeolite crystals whose b-axes (straight channels) are all oriented perpendicular to a substrate.

* * * * *